United States Patent [19]
Trotta

[11] Patent Number: 5,175,542
[45] Date of Patent: Dec. 29, 1992

[54] INTERACTIVE PROMOTIONAL DEVICE

[75] Inventor: Frank A. Trotta, Maplewood, N.J.

[73] Assignee: Intermark Corporation, New York, N.Y.

[21] Appl. No.: 554,739

[22] Filed: Jul. 18, 1990

[51] Int. Cl.$^5$ .......................... H05K 1/14; H05K 5/00
[52] U.S. Cl. ...................... 341/22; 361/395; 361/399; 248/558; 312/234
[58] Field of Search ................... 341/22, 27; 235/1 D, 235/145 R; 361/393-399, 391, 392, 427, 429, 395; 340/711; 312/265.6, 234; 248/27.1, 558; 364/708

[56] References Cited
U.S. PATENT DOCUMENTS

| | | | |
|---|---|---|---|
| 4,160,271 | 7/1979 | Grayson et al. | 341/27 |
| 4,326,193 | 4/1982 | Markley et al. | 340/711 |
| 4,327,809 | 5/1982 | Fenstermaker | 248/558 |
| 4,336,569 | 6/1982 | Tsuda et al. | 361/399 |
| 4,479,798 | 10/1984 | Romano et al. | 364/708 |
| 4,841,412 | 6/1989 | Heys, Jr. et al. | 361/393 |
| 4,920,799 | 5/1990 | Low | 348/27.1 |
| 4,992,903 | 2/1991 | Chen | 364/708 |

OTHER PUBLICATIONS

Intermark ® Corporation advertisement Jul. 1989.

Primary Examiner—Donald J. Yusko
Assistant Examiner—Brian Zimmerman
Attorney, Agent, or Firm—Hedman, Gibson & Costigan

[57] ABSTRACT

A customer interactive promotional device comprising housing means including snap together front cover and back cover, mounting means with snap together means for attachment to said housing means, and interactive means comprising a keypad, microprocessor and signal means wherein assembly of the device requires no tools or hardware.

24 Claims, 5 Drawing Sheets

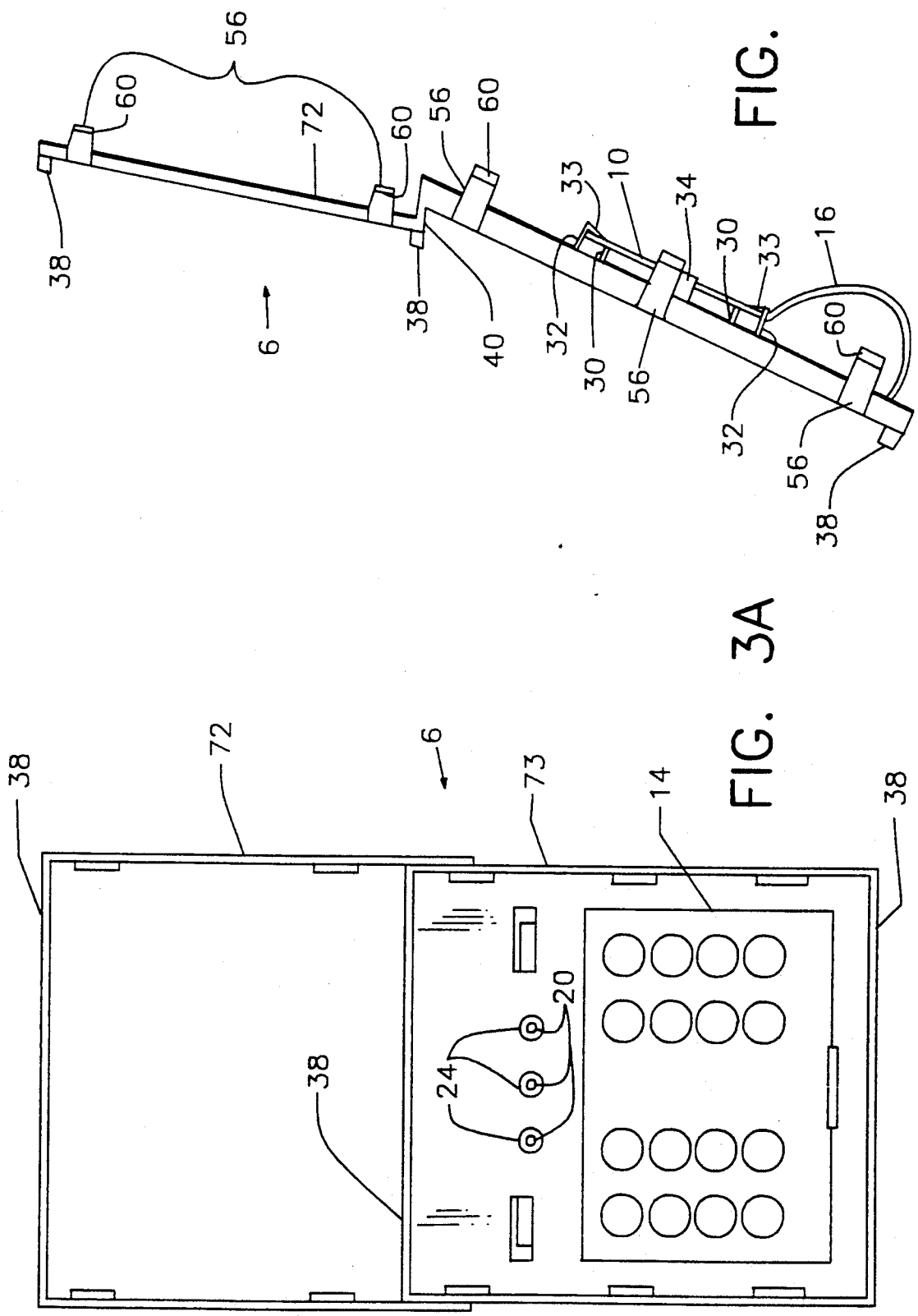

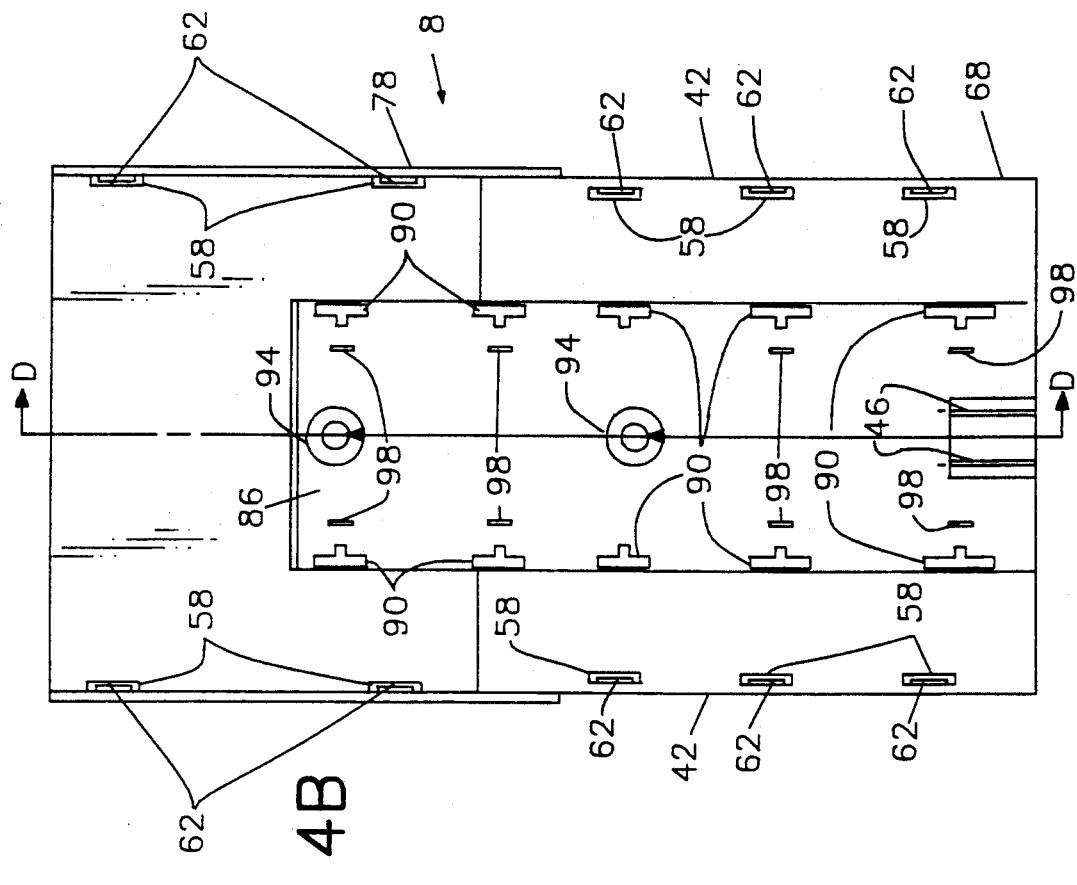
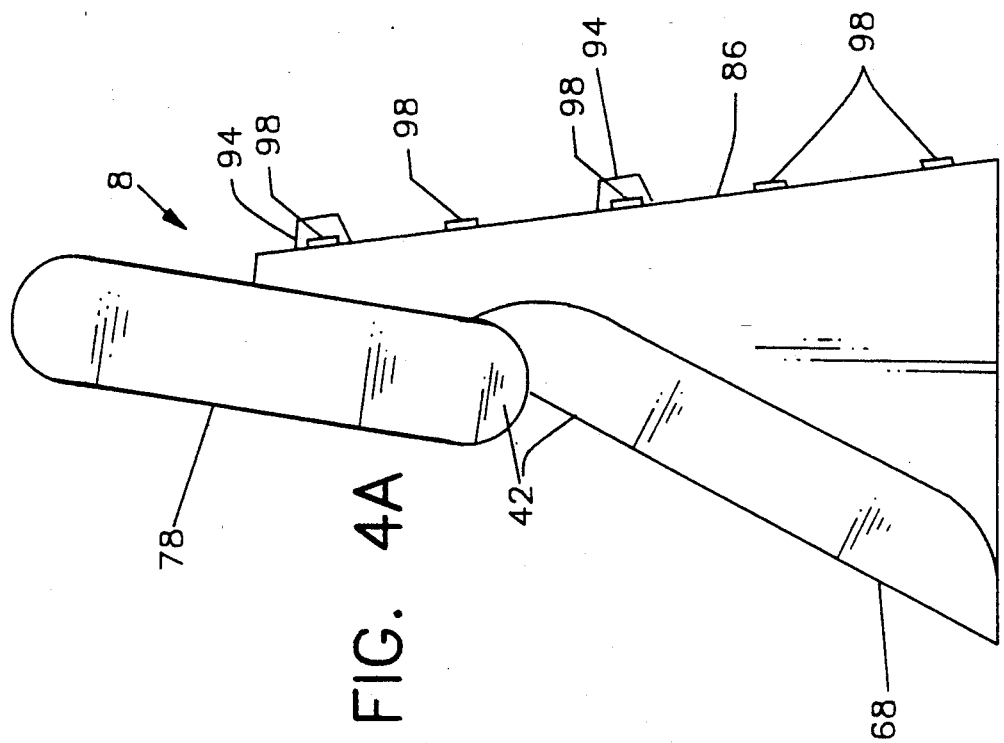
FIG. 4B
FIG. 4A

INTERACTIVE PROMOTIONAL DEVICE

FIELD OF THE INVENTION

The present invention relates to promotional devices and more specifically to promotional devices which requires customer interaction.

BACKGROUND OF THE INVENTION

Customer interaction has become a growing method of attracting customers to the point of sale of many products. Devices which require customer participation to answer questions, and thereby promote a product, have recently emerged as a popular means of attracting customers. The housing for one such promotional device used to attract customers and answer questions as to specific products is described in U.S. Pat. application Ser. No. 07/427,617 (incorporated herein by reference) which teaches a versatile assembly for housing a variety of customer interactive computer boards to be located at the point of sale.

However, as these customer interactive promotional devices have become more popular they have also become more complicated in an effort to attract the customer's attention. The use of lights, noises and printed circuit boards needing power, housed in elaborate housings which are expensive to produce and assemble, have driven the cost of such devices up, thereby limiting wide availability at displays. Also, such elaborate device take up valuable display space.

It is therefore an object of the present invention to provide a point of purchase, customer interactive promotional device which attracts customers and is easy to use.

It is a further object to provide such a promotional device which is inexpensive to produce, looks good and is stable enough to stand up to customer use.

Another object of the invention is to provide a device which can be placed on a variety of different standard displays and requires limited display space.

SUMMARY OF THE INVENTION

These and other objects are achieved by a customer interactive promotional device comprising housing means, interactive means and mounting, said housing means and mounting means having corresponding snap together means, said housing means further comprising front cover means and back cover means having corresponding snap together means and snap in retention means for holding a microprocessor board associated with said interactive means within said housing means.

The interactive means comprises input means, analysis means comprising a microprocessor and signal means. The input means is attached to the exterior of the housing means and comprises a key pad, which communicates with the microprocessor on the interior of the housing means by a ribbon cable. Signal means preferably comprises LED's (light emitting diodes) which are controlled by the microprocessor. The housing means includes space for containing a battery pack which makes up power means for driving the interactive means.

The snap-in means to connect the front cover to the back cover is preferably a tab lock system. The tab lock system preferably comprises barbed tabs, the barbs of which engage shelves and/or apertures corresponding to said barbs. The barbs and shelves are situated so that the components form a snug engagement.

The mounting means is preferably a separate element with means to attach the device to various standard display systems. The housing, comprising the front cover and back cover, and contents, is preferably attached to the mounting means with snap-in means similar to those used to attach the front and back covers. Angled members on the contacting back cover and mounting means are designed for ease of customer use.

Also, a spacer, having snap-in means adapted to match the engagement means between the back cover and mounting means can optionally be used to position the device further out from the given display.

Keyed members which relate to apertures on adjacent components are preferably included on the housing means and mounting means, as well as on the spacer, if used, to provide stability to the device and limit movement of the attached components. Butting members are also preferably used between the front cover means and the back cover means to ensure stability and proper alignment.

The front cover means, back cover means, mounting means and spacer are all made from injection molded plastic to close tolerances to assure that the snap together means and keyed means accurately match up to form a stable, secure unit. Preferred are ABS plastic or high impact polystyrene.

The front cover also includes means to identify the product to which the device relates, as well as to identify questions and answers relating to the keypad and provide possible advices relating to the LEDs. The preferred means include replaceable overlays attached to the front cover or markings on the front cover directly.

BRIEF DESCRIPTION OF THE DRAWINGS

The following drawings, in which like reference characters represent like parts, are illustrative of an embodiment of the present invention, not intended to limit the invention, wherein:

FIG. 3A is a front elevational view of the front cover of the housing of the invention with the keypad in place;

FIG. 3B is a side elevational view of the front cover with the keypad in place;

FIG. 4A is a side elevational view of the back cover of the housing;

FIG. 4B is a rear elevational view of the back cover of the housing;

DETAILED DESCRIPTION OF THE PREFERRED EMBODIMENT

Figure 1:
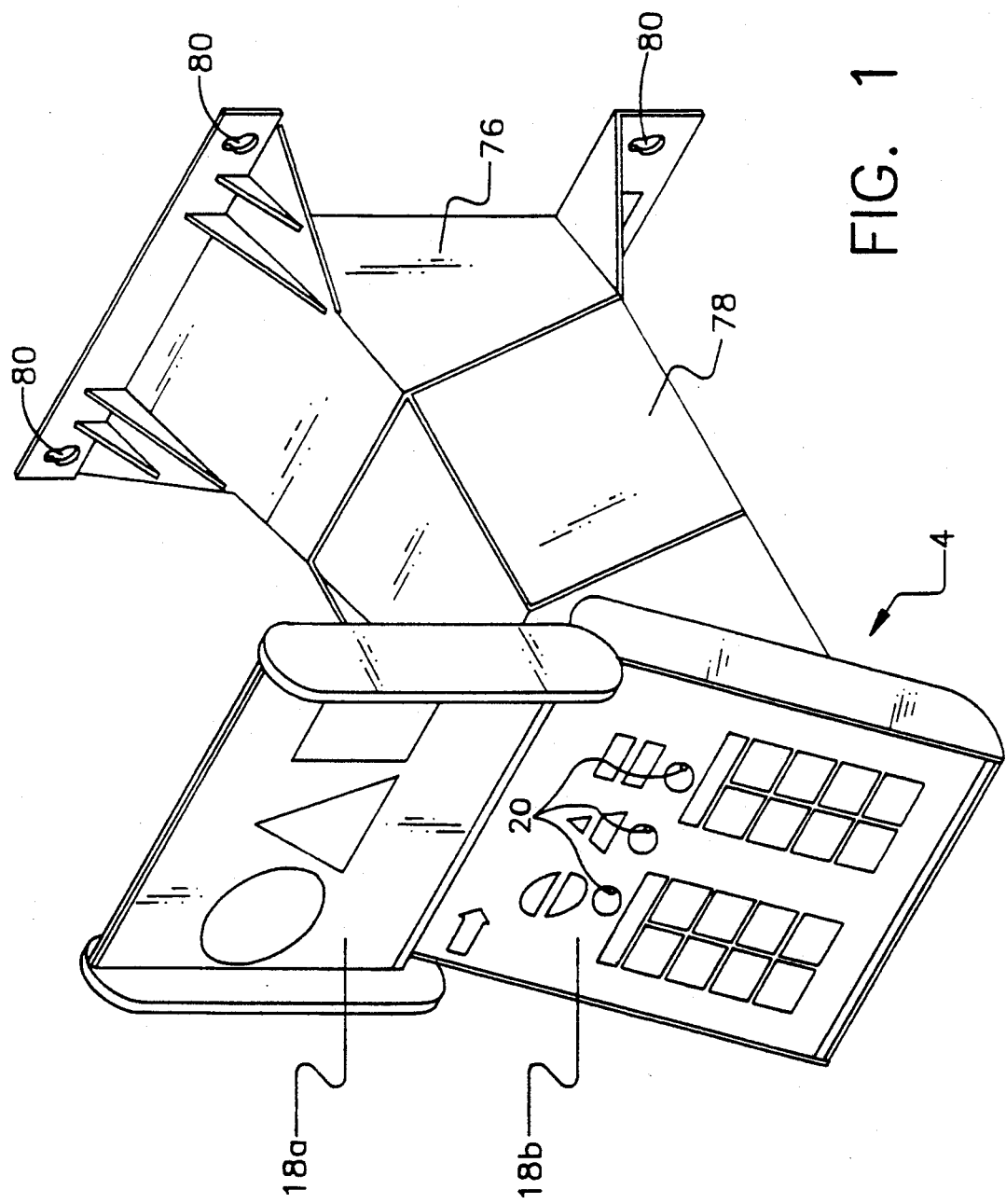
FIG. 1 is a perspective view of the device of the present invention.
Figure 2:
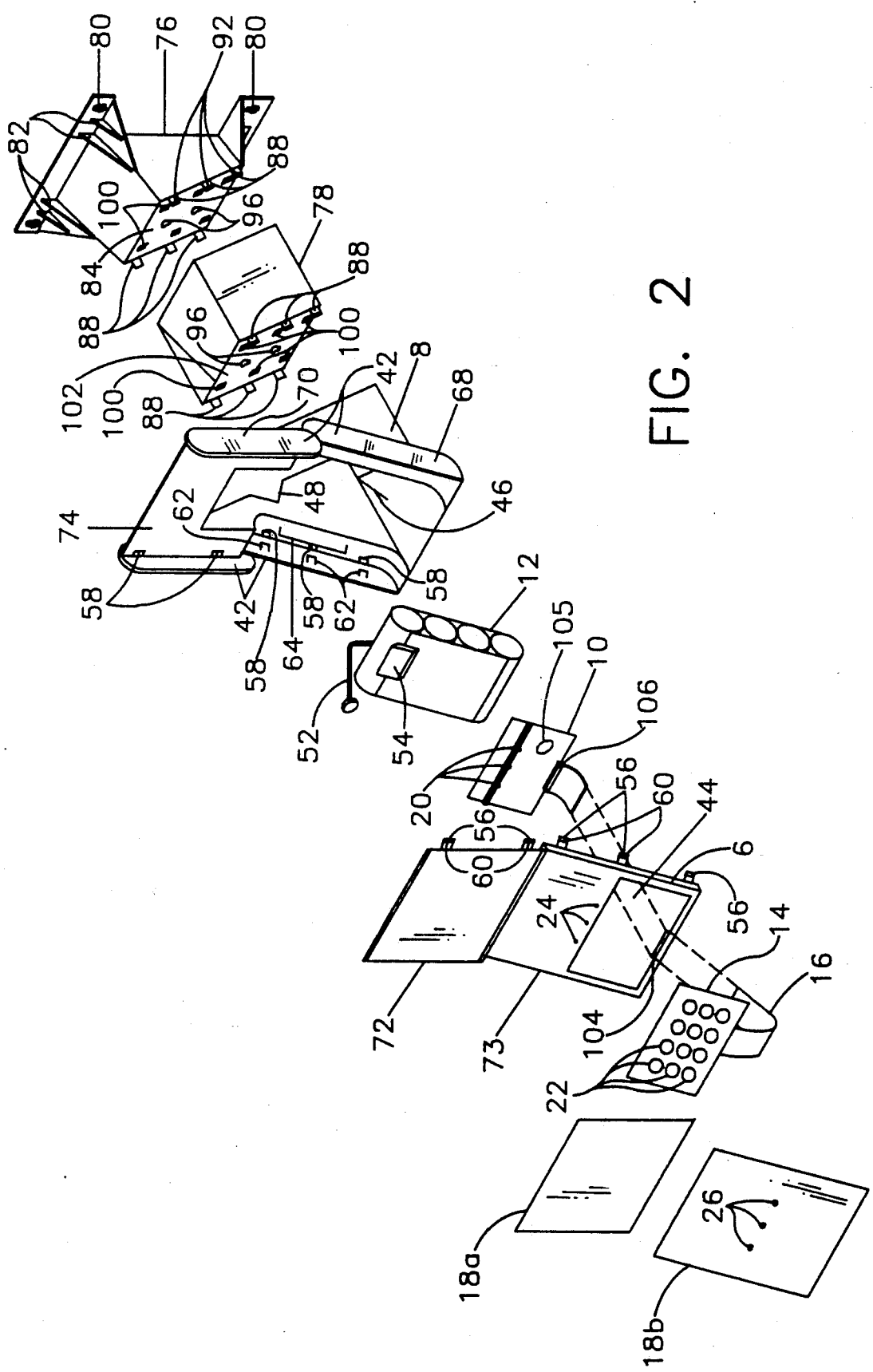
FIG. 2 is an exploded view of the components of the invention.
Figure 4D:
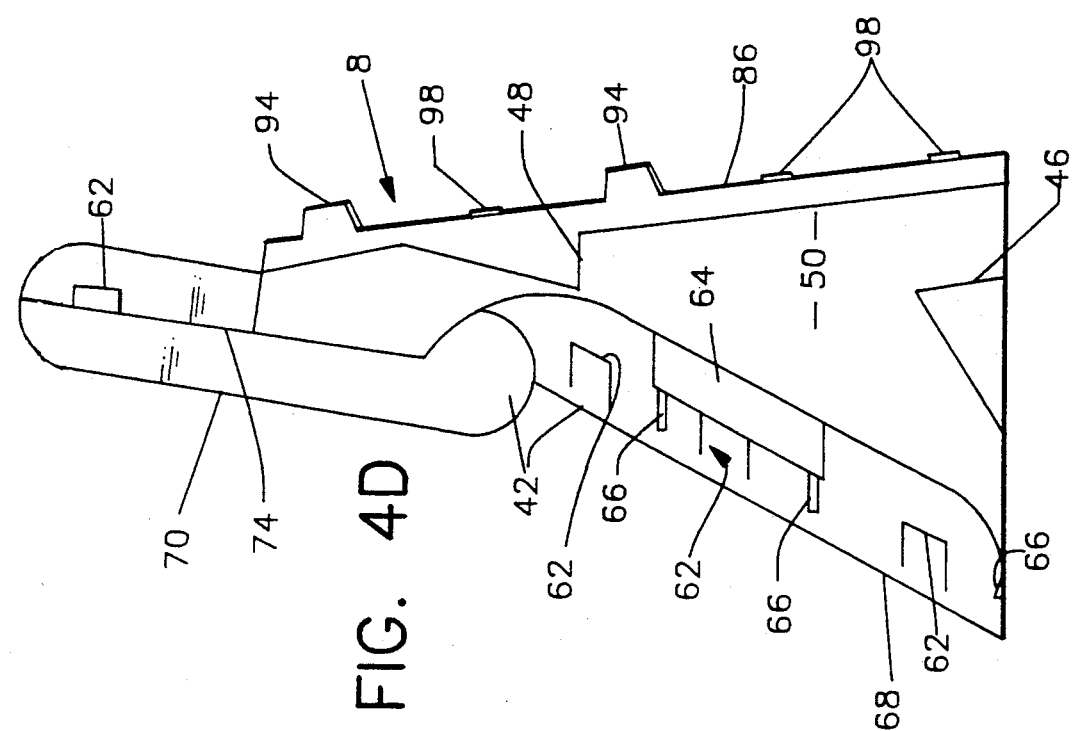
FIG. 4D is a cross-sectional view of the back cover through line D—D of FIG. 4B.
Figure 4C:
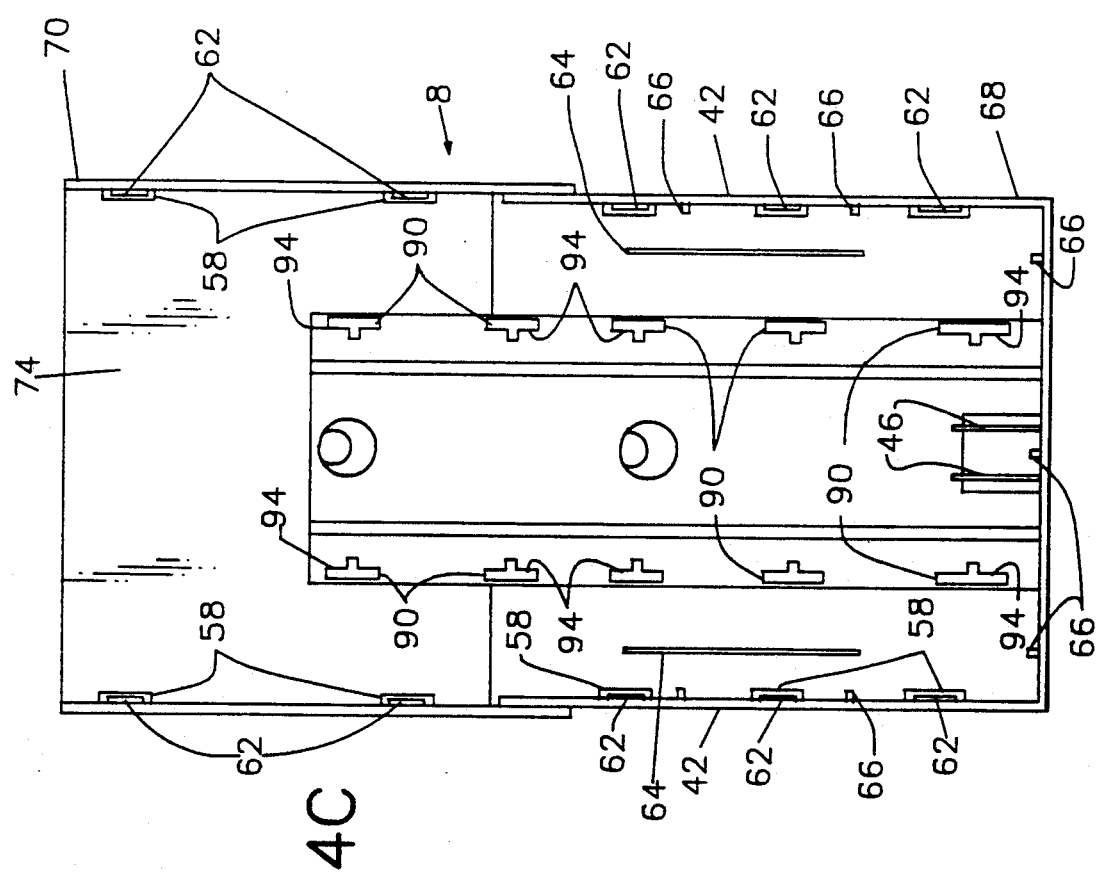
FIG. 4C is a front elevational view of the back cover of the housing.

With reference to the Figures, and specifically FIGS. 1 and 2, the preferred embodiment of the device 2 of the present invention comprises a housing 4, made up of a front cover 6 and a back cover 8, which houses a microprocessor board 10 and a battery pack 12. A keypad 14 is attached to the front cover 6 and data is transmitted from the keypad 14 to the microprocessor 10 by a ribbon cable 16. Overlays 18a and 18b are attached to the front cover 6 to attract the user to the device 2 and to present questions with a number of possible answers located over specific keys 22 of the keypad 14. LEDs 20 on the microprocessor board 10 align with holes 24 in the front cover 6 and holes or transparent portions 26 of the overlay 18b. The LEDs 20 relate to specific recommendations determined by the microprocessor 10 in response to the user's answers inputted on the keypad 14.

As shown in FIGS. 3A and 3B, the microprocessor board 10 is removably attached to the back of the front cover 6 to avoid movement and possible damage. Preferably, the microprocessor board 10 rests on posts 30 which extend from the back of the front cover 6 and is engaged by barbed clip means 32 which also extend from the back of the front cover 6. The barb 33 on the end of the barbed clip means 32 engages the board 10 to hold it securely to the posts 30.

Preferably, four posts 30 align under four clip means 32, two on the top edge of the board 10 and two on the bottom edge of the board 10, one at each end of the top and bottom edges. Alignment means 34 are located on each side of the board 10 to prevent lateral movement of the board 10. The absence of clip means 32 on the sides of the board 10 provides for easier removal of the board 10 from the front cover 6. Of course, other attachment means, such as bands, snaps, etc. can be used instead of or in addition to the means described.

The keypad 14 is preferably a membrane type keyboard which is substantially flat. The keypad 14 is attached to the face of the front cover 6 in a recess 44 on the front cover 6 by adhesives, snaps, etc., with adhesives being preferred. The recess 44 is about 1/16 to about ⅛ inch deep within the front cover 6. The use of a recess 44, combined with the flat keypad 14 allows the overlay 18b to be placed over the keypad 14 without bumps for the keys 22.

The overlays 18a and 18b are preferably removably attached to the face of the front cover 6 by adhesive means. Most preferred is a peal away backing which exposes an adhesive on the back of the overlays 18a or 18b so the overlays 18a and 18b can be attached to the front cover 6. Extensions 38, which engage the top and bottom edges of the overlay 18a and the bottom edge of overlay 18b, with the top edge of overlay 18b contacting the ridge 40, are provided to properly align the overlays 18a and 18b on the front cover 6. Lateral alignment of the overlays 18a and 18b is provided by contact with the sides 42 of the back cover 8 when the back cover 8 is in assembly engagement with the front cover 6. The described alignment means preferably includes the use of relatively accurately sized overlays 18a and 18b for aesthetics.

Of course, other attachment means for the overlays 18a and 18b can be used in addition to or in substitution of the above-described means, including snaps, clips, slide-in means, VELCRO, etc. Alternatively, the information on the overlays 18a and 18b can be marked directly on the face of the front cover 6 with paints, markers, imprints, etc.

The back cover 8 of the housing 4, shown in FIGS. 4A-4D, has interior space just sufficient to house the battery pack 12 and provide room for the microprocessor board 10 attached to the back of the front cover 6 when the front cover 6 is brought into assembly engagement with the back cover 8. The battery pack 12 is held in place within space 50 in the back cover 8 by retention means shown as bottom extensions 46 on the bottom of the interior of the back cover 8 and back extensions 48 on the back of the interior of the back cover 8. The battery pack 12 has a power line 52 which provides power to the microprocessor 10, line 52 ending in a push in jack connector which cooperates with a mate jack connector on the microprocessor board 10. The battery pack 12 preferably includes a foam spacer 54 which contacts the front cover 6 when the front cover 6 is in assembly engagement with the back cover 8, to physically secure the battery pack 12 within the housing 4.

The housing 4 needs no tools or hardware for closure, the front cover 6 and back cover 8 having corresponding tab lock snap-in means to securely engage the front cover 6 and back cover 8. The snap-in means preferably comprises barbed tabs 56 which extend from the side edges of the front cover 6 that align with tapered shelves 62 and apertures 58 in the back side of the back cover 8. Preferably, two (2) barbed tabs 56 are used on each side of the top section 72 of the front cover 6 and three (3) barbed tabs 56 on each side of the bottom section 73 of the front cover 6, each corresponding to a tapered shelf 62 and aperture 58 on the back cover 8.

The barb 60 on the outside of each of the barbed tabs 56 of the front cover 6 preferably contacts the corresponding tapered shelf 62 on the sides 42 of the back cover 8. As the barb 60 moves across the taper and engages the shelf 62, the front cover 6 is snapped into engagement with the back cover 8. Alternatively, the barbs 60 can directly engage the edges of the aperture 58 rather than the shelves 62, eliminating the need for the shelves 62. However, the use of shelves 62 allow for interior engagement of the barbed tabs 56, creating a more finished appearance. Although the apertures 58 are not necessary to allow the engagement of the barbed tabs 56 and interior shelves 62, the apertures 58 are considered necessary for injection molding the shelves 62.

The front cover 6 can be removed from the back cover 8 by pushing the barb 60 from the tapered shelf 62 through the apertures 58 which receive the barbed tabs 6, however, means for disassembly are not required.

To ensure snug assembly engagement of the front cover 6 with the back cover 8, the barbs 60 and shelves 62 are strategically placed to accurately engage. Also, the interior of the back cover 8 has several butting members which contact the front cover 6, or attachments thereto, when the snap-in means are engaged. Butting members 64 are located on the interior of the bottom section 68 of the back cover 8 which engage the microprocessor board 10 on the front cover 6. Also, edge butting members 66 are located on the sides 42 of the back cover 8 and on the bottom of the back cover 8 to engage the interior surface of the bottom section 73 of the front cover 6. The interior surface 74 of the top section 70 of the back cover 8 directly contacts the interior surface of the top portion 72 of the front cover 6, so no butting members are necessary between the top portions 70 and 72 of the covers 6 and 8.

Once the housing 4 is in its assembly engagement it is attached to a display by the mounting means comprising a mount 76, with or without the use of a mounting spacer 78. The mount 76 has means to engage the display comprising holes 80. More than one hole 80 per corner, placed at various distances, can be used to adapt the mount 76 to various standard displays. Reinforcement members 82 are used to provide a solid connection between the device 2 and the display.

The face 84 of the mount 76 contacts the back plate 86 of the back cover 8. Secure engagement of the housing 4 with the mount 76 is achieved through snap-in means similar to those used to engage the front cover 6 and back cover 8 of the housing 4. Barbed tabs 88 located on the edges of the mount face 84 extend into apertures 90 in the back plate 86 of the back cover 8. Barbs 92 on the barbed tabs 88 engage tapered shelves 94 within the back plate 86 adjacent to the apertures 90 when the mount 76 is snapped into assembly engagement with the housing 4.

Preferably, the mount 76 has three (3) barbed tabs 88 on each side edge of the face 84. The back plate 86 of the housing 4, however, preferably has five (5) apertures 90 on each edge, the distance between adjacent barbed tabs 88 and adjacent apertures 90 being equal. This configuration allows placement of the mount 76 on the housing 4 in either a high position, with the top barbed tabs 88 in the top apertures 90, or in a low position, with the bottom barbed tabs 88 in the bottom apertures 90.

Placement of the mount 76 in the high position on the housing 4 provides for a four (4) inch stand-off from the display. Placement of the mount 76 in the low position, however, due to the angles between the mount face 84 and the back plate 86, provides for a six (6) inch stand-off from the display.

Proper alignment and stability of the housing on the mount 76 are enhanced by the use of keyed cone projections 94 on the back plate 86 which engage corresponding keyed apertures 96 on the mount face 84. Additional key projections 98 are located on the back plate 86 which engage corresponding apertures 100 on the mount face 84. It should be noted with the illustrated embodiment that when the mount 76 is in the low position on the back plate 86, only the lower keyed cone projection 94 is engaged by the upper keyed aperture 96 and the lower keyed aperture 96 does not have a cone projection to engage on the embodiment illustrated.

The mount spacer 78 is used when a greater distance from the display is desired. The spacer face 102 is identical to the mount face 84, having the same barbed legs 88, keyed apertures 96 and apertures 100. The spacer back (not shown) opposite the spacer face has receiving means to accept the barbed legs 88 on the mount 76 and keyed cone projections 94 and projections 98 as located on the back plate 86 of the housing 4 to engage the keyed apertures 96 and apertures 100 on the mount face 84.

Preferably, the spacer 78 is approximately four (4) inches wide to allow an extension of about four (4) inches from the display when desired. Therefore, when the spacer 78 is used and engages the housing 4 in the high position there is an eight (8) inch stand-off from the display and, when in the low position, a ten (10) inch stand-off from the display. Of course, however, various sized spacers can be made available.

The housing and mounting components of the present device 2, including the front cover 6, the back cover 8, the mount 76 and the spacer 78 are made from injection molded plastic for light weight, durability and accurate manufacture specification tolerances. Preferably, the plastic components are made of approximately 1/16 to ⅛ inch thick plastic, such as ABS plastic or high impact polystyrene.

Additionally, the keypad 14 and/or the LEDs 20 can be combined with an audio device 105 to be placed on the microprocessor board 10 or elsewhere inside or on the housing to provide additional user stimulus and promote additional user interest.

In all, the device 2 of the present invention requires no tools or hardware for manufacture, significantly reducing its cost to produce. To assemble, the keypad 14 is adhered to the front cover 6 with the ribbon cable 16 passed through an aperture 104 in the front cover 6. The ribbon cable 16 is then pushed into receptacle 106 on the microprocessor board 10. The microprocessor board 10 is then snapped onto the interior side of the front cover 6 and the battery pack 12 is placed in space 50 of the back cover 8, within retention means 46 and 48. The jack on the wire 52 from the battery pack 12 is pushed onto a receiving mate jack on the microprocessor board 10 and the front cover 6 is snapped into assembly engagement with the back cover 8. The mounting means are then attached, including the mount 76 with or without the spacer 78, by snap together means between the mounting means and the housing 4. The overlays 18a and 18b have the peel away backing removed and are adhered to the front cover 6 at any point after the keypad 14 is adhered to the front cover 6 and the front cover 6 is placed in assembly engagement with the back cover 8.

Obvious variations on the above-identified invention will make themselves apparent to one skilled in the art. Such variations are intended to be covered herein, limited only by the appended claims.

I claim:

1. A customer interactive promotional device comprising housing means, interactive means and mounting means, said housing means consisting essentially of a front cover means and a back cover means, said front cover means and back cover means having corresponding snap together means, the front cover means further comprising an interior and an exterior wherein the interactive means are located on the exterior and snap in retention means for holding a microprocessor board associated with said interactive means are located on the interior of said front cover means within said housing means, and further wherein said housing means and mounting means have corresponding snap together means, said snap together means comprising a plurality of shelves on the interior of the back cover means in spacial relationship to apertures in the back cover means, said shelves and apertures being greater in number than a plurality of barbed tabs on said mounting means, said barbed tabs designed to engage a like number of the shelves and apertures in the back cover to provide for assembly engagement of the housing means and mounting means in more than one position.

2. The device of claim 1 wherein the housing means and mounting means are formed by injection molding plastic taken from the group comprising ABS plastic and high impact polystyrene.

3. The device of claim 1 wherein said interactive means comprises input means attached to the exterior of said front cover means, analysis means comprising a microprocessor retained on the interior of said front cover means, and signal means.

4. The device of claim 3 wherein said input means comprises a keypad, having two or more keys.

5. The device of claim 4 wherein the keypad is attached to the exterior of said front cover means by adhesive means.

6. The device of claim 4 further comprising a recess in the exterior of said front cover means within which the keypad is attached, and remains relatively flush with the exterior of the front cover means, and an overlay attached to said front cover means over said keypad for the user to determine the input relating to each of said keys.

7. The device of claim 6 wherein the overlay is attached to the front cover means by adhesive means.

8. The device of claim 3 wherein the input means communicates with the microprocessor by a ribbon cable having push in connector means.

9. The device of claim 3 wherein the signal means comprises at least two LEDs visible on the front cover means and communicating with the microprocessor.

10. The device of claim 3 wherein said interactive means further comprises audio means relating to at least one of said input means and said signal means.

11. The device of claim 1 wherein the corresponding snap together means between said front cover means and said back cover means comprises one or more barbed tabs, having barbs on the ends thereof, on said front cover means corresponding to strategically placed shelves on the interior of said back cover means wherein said barbs engage said shelves when said front cover means is brought into assembly engagement with said back cover means.

12. The device of claim 1 further comprising butting members between the front cover means and back cover means to ensure proper alignment of the front cover means and the back cover means when the housing means is in assembly engagement.

13. The device of claim 1 wherein the housing means, interactive means and mounting means can be assembled by hand, without tools or hardware.

14. The device of claim 1 further comprising alignment means between aid mounting means and said back cover means.

15. The device of claim 14 wherein the alignment means comprises projections and corresponding apertures on said back cover means and said mounting means.

16. The device of claim 1 further comprising spacer means between said back cover means and said mounting means, having snap together means on each side of said spacer means to engage said mounting means on one side and said back cover means on the other side.

17. The device of claim 1 wherein engagement of the housing means and mounting means in more than one position allows the device to stand-off various distances from a display on which the device is mounted.

18. The device of claim 1 wherein the snap together means between said mounting means and said back cover means provides snug engagement of said housing means and said mounting means.

19. The device of claim 1 wherein the snap together mean between said front cover means and said back cover means provides tight engagement of said front cover means and said back cover means.

20. The device of claim 1 wherein the mounting means has various attachment means to attach the device to a variety of displays.

21. The device of claim 20 wherein the various attachment means comprises a variety of apertures in said mounting means which are spaced apart to relate to attachment spacing on a variety of standard displays.

22. The device of claim 20 wherein the mounting means further comprises reinforcement members on said mounting means in relation to the attachment means.

23. The device of claim 1 wherein the interior of the housing means includes retention means for retaining power supply means to power said interactive means in said housing.

24. The device of claim 23 wherein said power means comprises a battery pack connected to said interactive means by push together integrated jack means.

* * * * *